(12) United States Patent
Nanba

(10) Patent No.: US 7,283,314 B2
(45) Date of Patent: Oct. 16, 2007

(54) ZOOM LENS AND IMAGE PICKUP APPARATUS INCLUDING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/467,704

(22) Filed: Aug. 28, 2006

(65) Prior Publication Data

US 2007/0053072 A1    Mar. 8, 2007

(30) Foreign Application Priority Data

Sep. 6, 2005  (JP) .............................. 2005-257698
Jul. 13, 2006  (JP) .............................. 2006-192904

(51) Int. Cl.
*G02B 9/12* (2006.01)

(52) U.S. Cl. ........................ 359/784; 359/669; 359/680

(58) Field of Classification Search ................ 359/784, 359/669, 680, 782, 783, 781, 683, 687, 774
See application file for complete search history.

(56) References Cited

U.S. PATENT DOCUMENTS

| | | | |
|---|---|---|---|
| 6,498,687 B1 | 12/2002 | Sekita et al. | |
| 6,545,819 B1 | 4/2003 | Nanba et al. | |
| 6,744,564 B2 | 6/2004 | Mihara et al. | |
| 6,809,879 B2 | 10/2004 | Mihara | |
| 6,822,808 B2 | 11/2004 | Nanba et al. | |
| 6,862,143 B2 | 3/2005 | Hoshi et al. | |
| 6,999,242 B2 | 2/2006 | Nanba et al. | |
| 7,023,625 B2 | 4/2006 | Nanba et al. | |
| 7,256,949 B2 * | 8/2007 | Ohshita et al. | ............. 359/754 |

FOREIGN PATENT DOCUMENTS

| | | |
|---|---|---|
| JP | 2001-066503 A | 3/2001 |
| JP | 2001-281545 A | 10/2001 |
| JP | 2002-055278 A | 2/2002 |
| JP | 2003-005072 A | 1/2003 |
| JP | 2003-149555 A | 5/2003 |
| JP | 2003/149556 A | 5/2003 |

\* cited by examiner

*Primary Examiner*—Timothy Thompson
(74) *Attorney, Agent, or Firm*—Canon USA, Inc, IP Division

(57) ABSTRACT

At least one exemplary embodiment is directed to a zoom lens which includes, in order from an object side to an image side, a first lens unit with a negative refractive power, a second lens unit with a positive refractive power, and a third lens unit with a positive refractive power. A first gap between the first and second lens units when the zoom lens is at a wide-angle end is smaller than the first gap when the zoom lens is at a telephoto end, where a second gap between the second and third lens units when the zoom lens is at the wide-angle end is larger than the second gap when the zoom lens is at the telephoto end. The second lens unit includes at least one positive cemented lens.

10 Claims, 7 Drawing Sheets

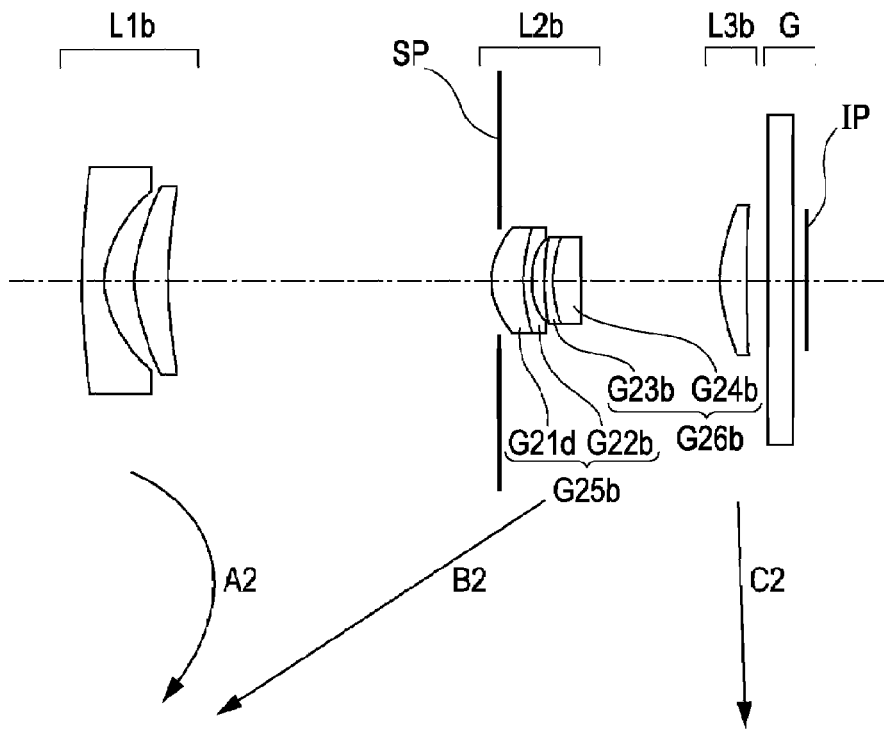
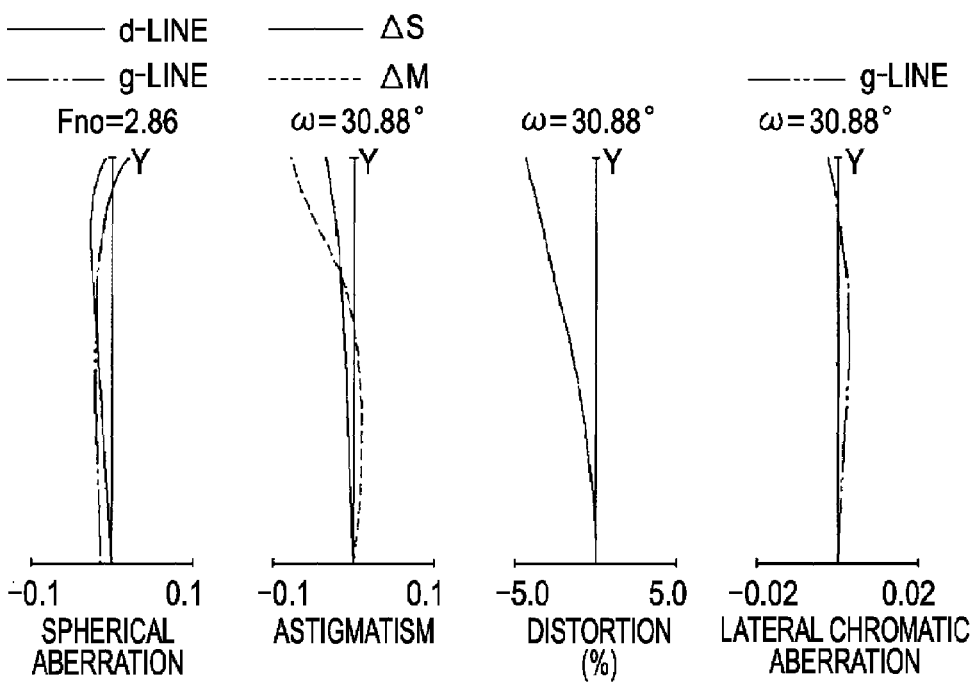

ZOOM LENS AND IMAGE PICKUP APPARATUS INCLUDING THE SAME

BACKGROUND OF THE INVENTION

1. Field of the Invention

The present invention relates to a zoom lens and, in particular, though not exclusively, to a zoom lens suited for an image pickup apparatus (e.g., a digital still camera and a video camera).

2. Description of the Related Art

For an image pickup apparatus (e.g., a video camera, digital still camera, and other image pickup apparatus as known by one of ordinary skill in the relevant arts and equivalents) using a solid-state image pickup device, a smaller sized zoom lens having a larger zoom ratio would be useful.

A camera of this type includes various optical elements, such as a low-pass filter and a color compensating filter, arranged between a backmost lens and a solid-state image pickup device.

Therefore, a zoom lens used in this kind of camera typically has a relatively long back focus.

A zoom lens that has a leading lens unit with a negative refractive power, which is a so-called negative lead type zoom lens, is an example of an optical lens system that acquires a long back focus.

For a color camera using a solid-state image pickup device for color images, high image-side telecentricity is useful to avoid color shading.

A zoom lens including three lens units in which, from an object side to an image side, a first lens unit has a negative refractive power, a second lens unit has a positive refractive power, and a third lens unit has a positive refractive power are disposed, where the diameter of a front lens element is small, and the image side is telecentric as discussed in, for example, U.S. Pat. Nos. 6,545,819, 6,822,808, 6,862,143, 7,023,625, 6,999,242, and 6,498,687.

A three-unit zoom lens (zoom lens comprising three lens units) of this type in which all lens units move for zooming and chromatic aberration is compensated by using a cemented lens in the second lens unit is discussed in, for example, Japanese Patent Laid-Open No. 2003-005072 and U.S. Pat. No. 6,744,564 and No. 6,809,879.

A three-unit zoom lens, which aims to reduce the number of lens elements, in which a lens element having a negative refractive power in a first lens unit has an aspheric object-side surface and an aspheric image-side surface is discussed in, for example, Japanese Patent Laid-Open No. 2002-055278.

It is useful for a zoom lens used in a video camera or a digital video camera to have a smaller size and a higher zoom ratio.

In the three-unit zoom lens including lens units having negative, positive, and positive refractive powers, respectively, as described above, the stroke of the second lens unit increases as the zoom ratio becomes higher. This results in an increase in the length of the entire lens system, and it is difficult to reduce the size of the zoom lens while achieving a higher zoom ratio. Therefore, many three-unit zoom lenses have a zoom ratio of the order of 3×.

To reduce the thickness of the image pickup apparatus, a so-called collapsible lens system, in which space between lens units can be shortened except during picture taking, is used.

To reduce the thickness of the apparatus, a reduction in the thickness of each of the lens units can be required.

In the three-unit zoom lens described above, the second lens unit is a main lens unit for changing magnification. Therefore, in order to achieve a higher zoom ratio, aberration variations during zooming should be reduced in the second lens unit. To this end, a certain number of lens elements are needed, thus resulting in an increase in the size of the second lens unit.

Consequently, it is important to appropriately set configuration of the second lens unit in the three-unit zoom lens in order to reduce the thickness of the entire lens system while achieving a higher zoom ratio.

SUMMARY OF THE INVENTION

At least one exemplary embodiment of the present invention is directed to a zoom lens having a compact lens system and a high zoom ratio and is also directed to an image pickup apparatus including the zoom lens.

According to a first aspect of the present invention, a zoom lens includes, in order from an object side to an image side, a first lens unit with a negative refractive power, a second lens unit with a positive refractive power, and a third lens unit with a positive refractive power. Each of the first and second lens units can move for zooming such that a first gap between the first lens unit and the second lens unit when the zoom lens is at a wide-angle end is smaller than the first gap when the zoom lens is at a telephoto end and such that a second gap between the second lens unit and the third lens unit when the zoom lens is at the wide-angle end is larger than the second gap when the zoom lens is at the telephoto end. The second lens unit includes at least one positive cemented lens, and, where a first lens cemented lens has the largest refractive power among the at least one positive cemented lens, the first cemented lens includes a first positive lens element and a first negative lens element. The following conditions can be satisfied:

$$0.9 < f2c/f2 < 1.5$$

$$1.8 < (N2p+N2n)/2$$

$$15 < v2n - v2p < 30$$

where $f2c$ is the focal length of the first cemented lens, $f2$ is the focal length of the second lens unit, $N2p$ is the refractive index of a material of the first positive lens element included in the first cemented lens, $N2n$ is the refractive index of a material of the first negative lens element included in the first cemented lens, $v2p$ is the Abbe number of the material of the first positive lens element included in the first cemented lens, and $v2n$ is the Abbe number of the material of the first negative lens element included in the first cemented lens.

According to a second aspect of the present invention, an image pickup apparatus includes a solid-state image pickup device and a zoom lens configured to form an image on the solid-state image pickup device. The zoom lens includes, in order from an object side to an image side, a first lens unit with a negative refractive power, a second lens unit with a positive refractive power, and a third lens unit with a positive refractive power. Each of the first and second lens units can move for zooming such that a first gap between the first lens unit and the second lens unit when the zoom lens is at a wide-angle end is smaller than the first gap when the zoom lens is at a telephoto end and such that a second gap between the second lens unit and the third lens unit when the zoom lens is at the wide-angle end is larger than the second gap when the zoom lens is at the telephoto end. The second lens unit includes at least one positive cemented lens, and, where a first lens cemented lens has the largest refractive power among the at least one positive cemented lens, the first cemented lens includes a first positive lens element and a first negative lens element. The following conditions can be satisfied:

$$0.9 < f2c/f2 < 1.5$$

$$1.8 < (N2p+N2n)/2$$

$$15 < v2n-v2p < 30$$

where f2c is the focal length of the first cemented lens, f2 is the focal length of the second lens unit, N2p is the refractive index of a material of the first positive lens element included in the first cemented lens, N2n is the refractive index of a material of the first negative lens element included in the first cemented lens, v2p is the Abbe number of the material of the first positive lens element included in the first cemented lens, and v2n is the Abbe number of the material of the first negative lens element included in the first cemented lens.

Further features of the present invention will become apparent from the following description of exemplary embodiments with reference to the attached drawings.

BRIEF DESCRIPTION OF THE DRAWINGS

FIG. 5 illustrates an optical cross-sectional view of a zoom lens according to a second exemplary embodiment.

FIG. 6 illustrates aberrations occurring when the zoom lens according to the second exemplary embodiment is at a wide-angle end.

DESCRIPTION OF THE EMBODIMENTS

Figure 1:
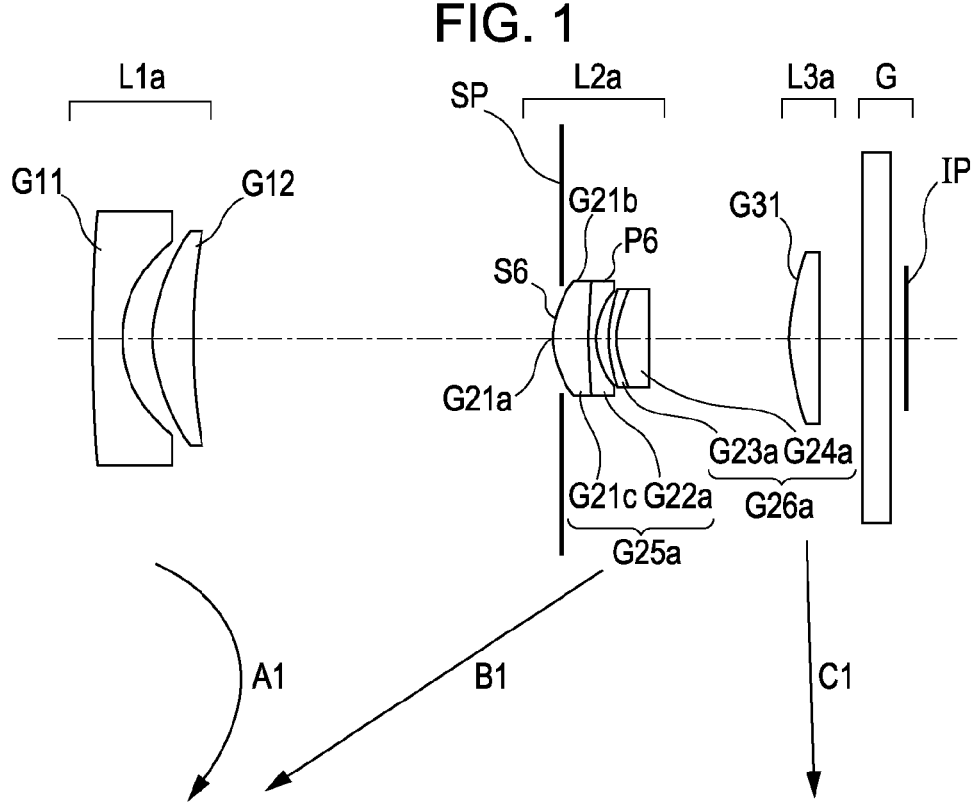
FIG. 1 illustrates an optical cross-sectional view of a zoom lens according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Exemplary embodiments of a zoom lens and an image pickup apparatus including the zoom lens are described below.

Figure 2:
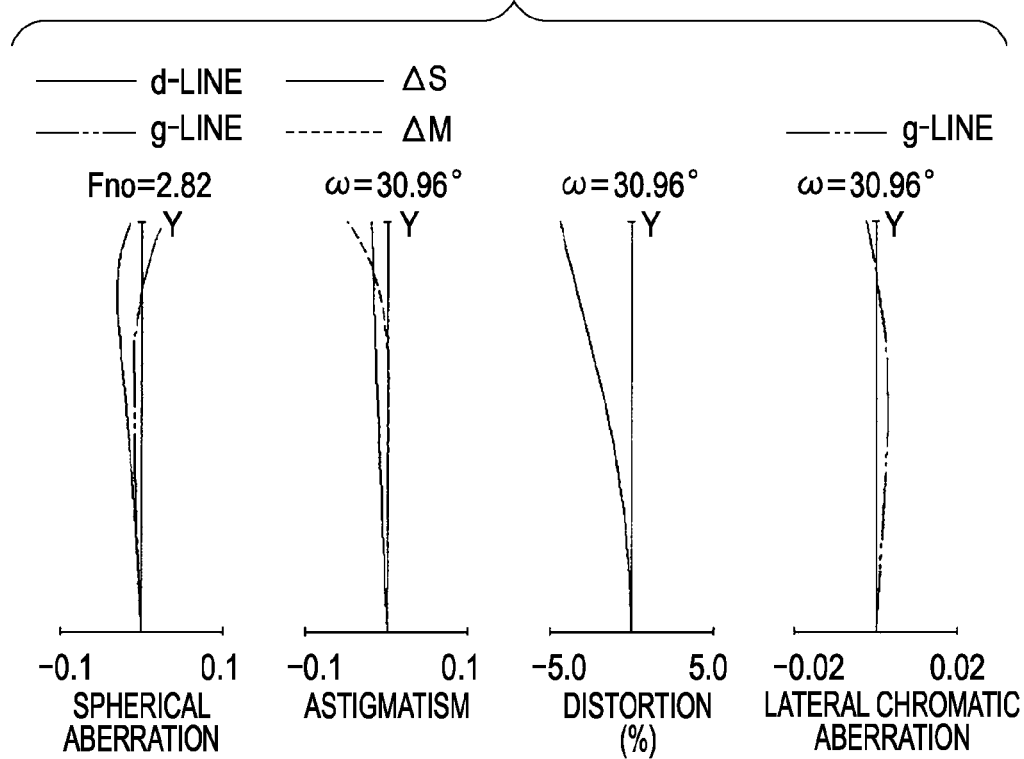
FIG. 2 illustrates aberrations occurring when the zoom lens according to the first exemplary embodiment is at a wide-angle end.
Figure 3:
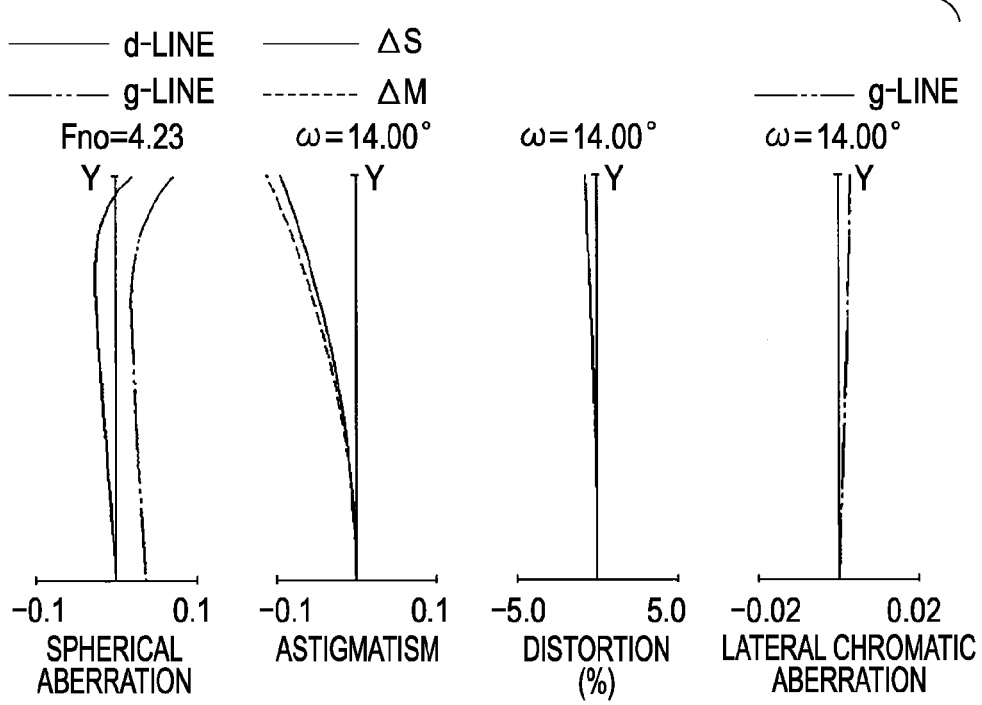
FIG. 3 illustrates aberrations occurring when the zoom lens according to the first exemplary embodiment is at an intermediate zoom position.
Figure 4:
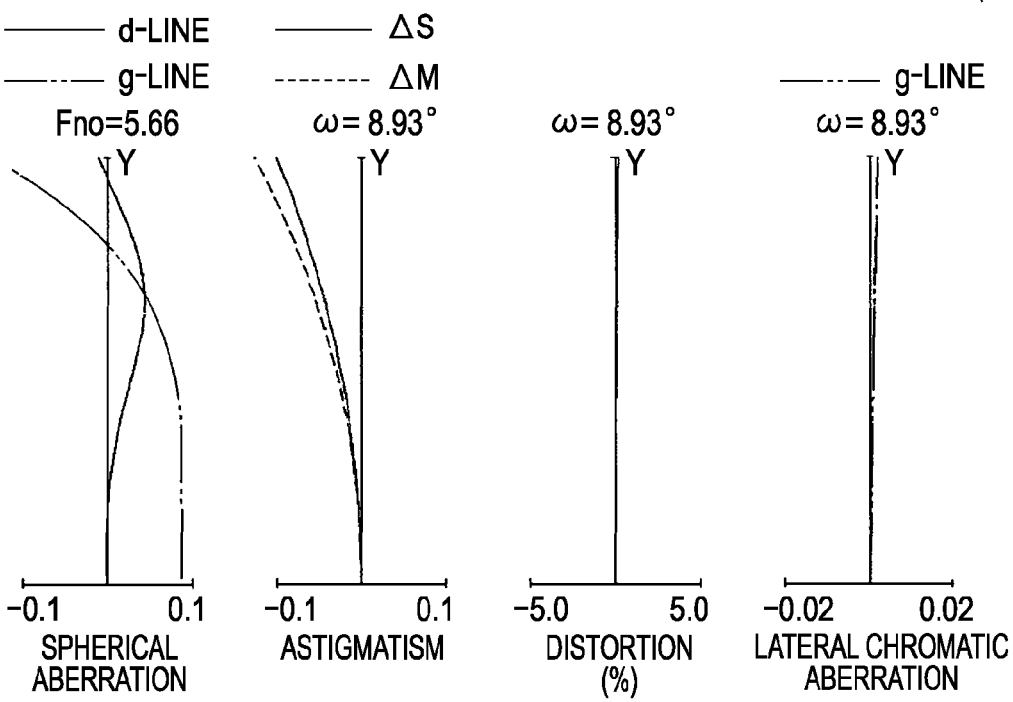
FIG. 4 illustrates aberrations occurring when the zoom lens according to the first exemplary embodiment is at a telephoto end.

FIG. 1 illustrates a cross-sectional view of a zoom lens according to a first exemplary embodiment when the zoom lens is at a wide-angle end (short focal length end). FIGS. 2, 3, and 4 illustrate aberrations occurring when the zoom lens according to the first exemplary embodiment is at the wide-angle end, at an intermediate zoom position, and at a telephoto end (long focal length end), respectively. The zoom lens according to the first exemplary embodiment has a zoom ratio of 3.81× and an F number of about 2.83 to 5.67.

Figure 7:
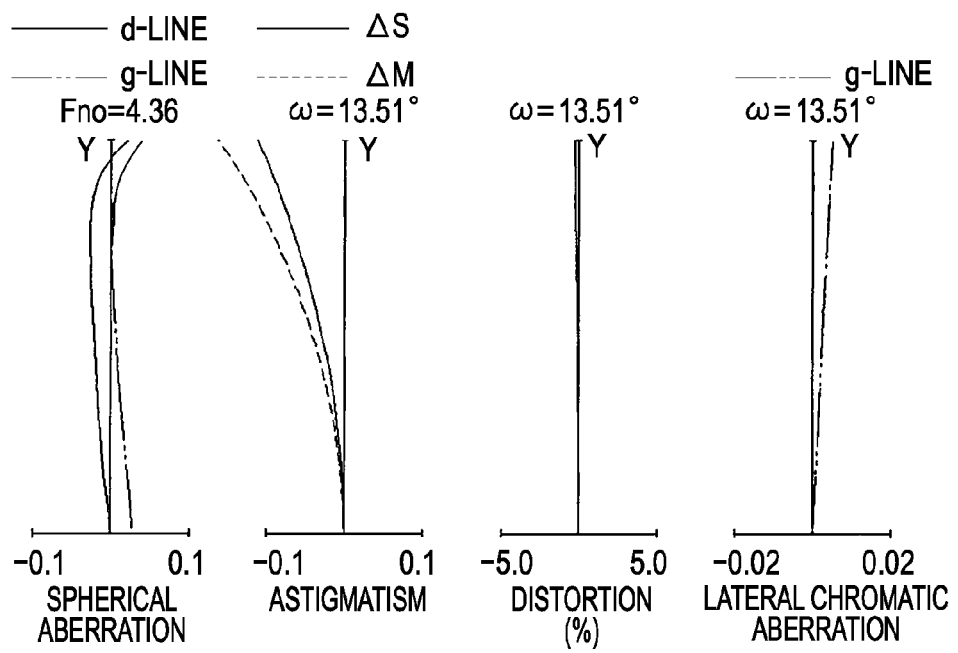
FIG. 7 illustrates aberrations occurring when the zoom lens according to the second exemplary embodiment is at an intermediate zoom position.
Figure 8:
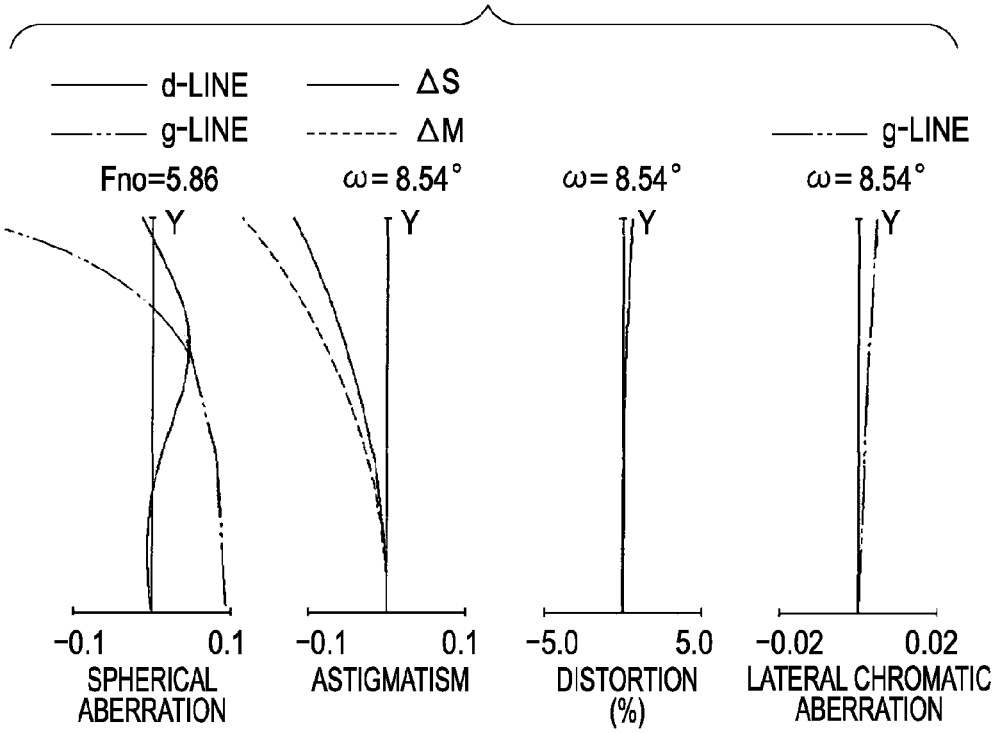
FIG. 8 illustrates aberrations occurring when the zoom lens according to the second exemplary embodiment is at a telephoto end.

FIG. 5 illustrates a cross-sectional view of a zoom lens according to a second exemplary embodiment when the zoom lens is at a wide-angle end. FIGS. 6, 7, and 8 illustrate aberrations occurring when the zoom lens according to the second exemplary embodiment is at the wide-angle end, at an intermediate zoom position, and at a telephoto end, respectively. The zoom lens according to the second exemplary embodiment has a zoom ratio of 3.99× and an F number of about 2.87 to 5.86.

Figure 9:
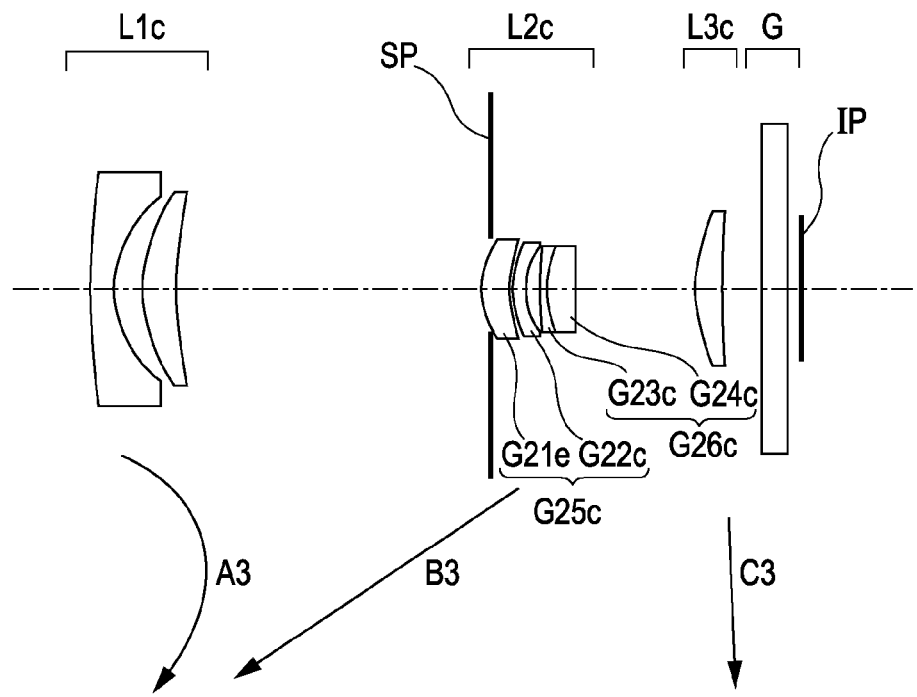
FIG. 9 illustrates an optical cross-sectional view of a zoom lens according to a third exemplary embodiment.
Figure 10:
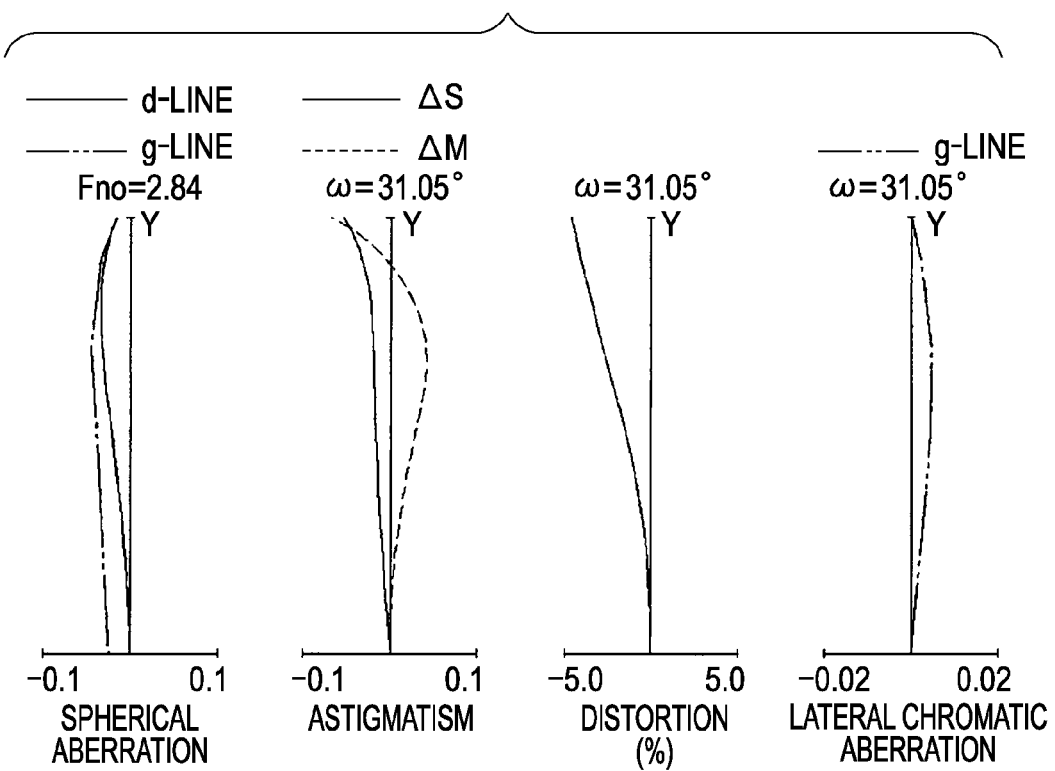
FIG. 10 illustrates aberrations occurring when the zoom lens according to the third exemplary embodiment is at a wide-angle end.
Figure 11:
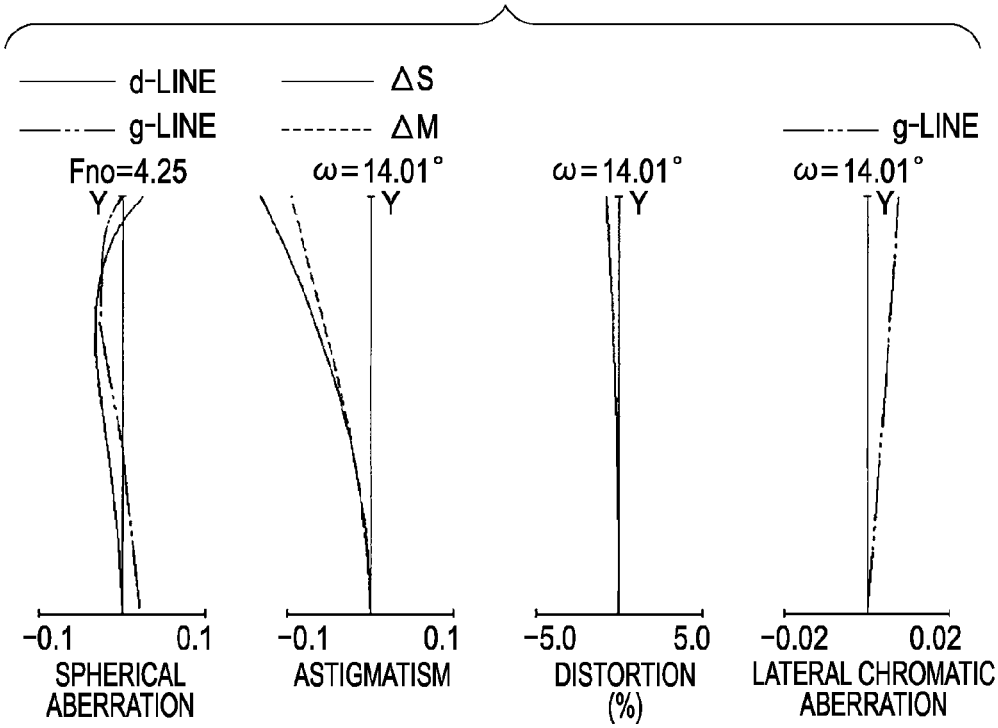
FIG. 11 illustrates aberrations occurring when the zoom lens according to the third exemplary embodiment is at an intermediate zoom position.
Figure 12:
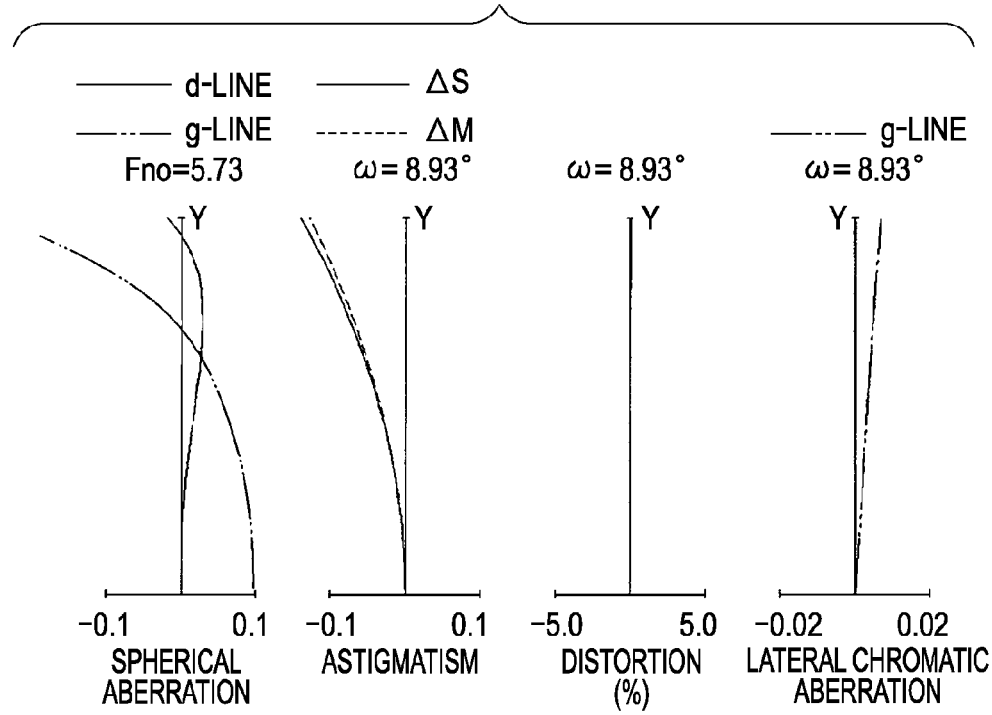
FIG. 12 illustrates aberrations occurring when the zoom lens according to the third exemplary embodiment is at a telephoto end.

FIG. 9 illustrates a cross-sectional view of a zoom lens according to a third exemplary embodiment when the zoom lens is at a wide-angle end. FIGS. 10, 11, and 12 illustrate aberrations occurring when the zoom lens according to the third exemplary embodiment is at the wide-angle end, at an intermediate zoom position, and at a telephoto end, respectively. The zoom lens according to the third exemplary embodiment has a zoom ratio of 3.83× and an F number of about 2.85 to 5.73.

Figure 13:
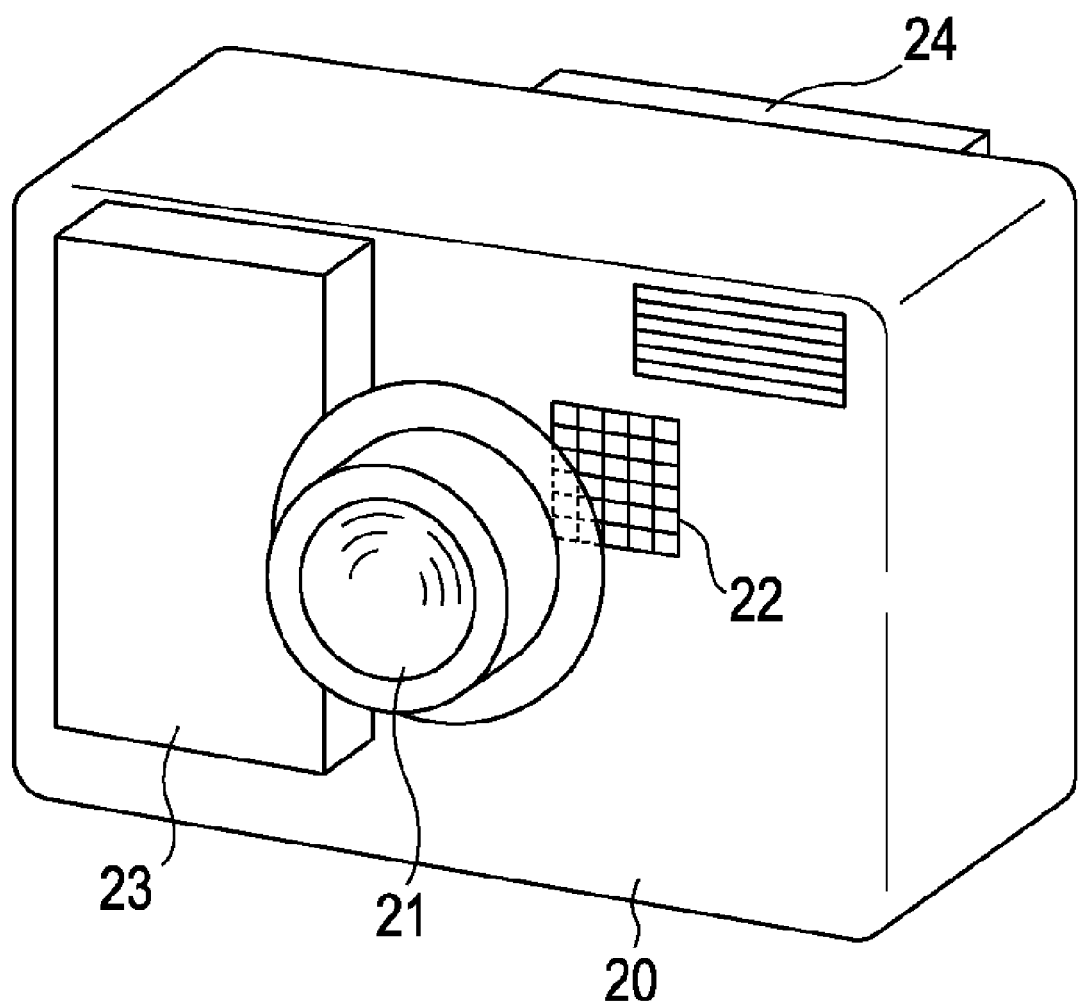
FIG. 13 illustrates a schematic view of an image pickup apparatus according to an exemplary embodiment.

FIG. 13 illustrates a schematic view of a digital still camera including the zoom lens according to an exemplary embodiment.

The zoom lens system according to the exemplary embodiments can be an image-taking lens system used in an image pickup apparatus. In the cross-sectional views of the zoom lens, the left side represents a subject (object) side (front) and the right side represents an image side (rear).

In the zoom lens system illustrated in the cross-sectional views of FIGS. 1, 5, and 9, a first lens unit L1a-c has a negative refractive power (optical power: the reciprocal of the focal length), a second lens unit L2a-c has a positive refractive power, and a third lens unit L3a-c has a positive refractive power.

An F-number determining member SP (hereinafter referred to also as "aperture stop") functions as an aperture stop for determining (limiting) light rays defined by the open F number (Fno).

Examples of an optical block G includes an optical filter, a faceplate, a crystal low-pass filter, an infrared cut filter, other optical filters as known by one of ordinary skill in the relevant arts, and equivalents. In the case where the zoom lens system is used as an image-taking optical system in a video camera or a digital still camera, an image pickup surface of a solid-state image pickup device (photoelectric conversion device) (e.g., a charge-coupled device (CCD) sensor, or a complementary metal-oxide semiconductor (CMOS) sensor, other image pickup devices as known by one of ordinary skill in the relevant arts, and equivalents), is disposed at an image plane IP.

In the case where the zoom lens is used as an image-taking optical system in a film-based camera, a photosensitive surface corresponding to a film surface is disposed at the image plane IP.

In the illustrations showing the aberrations, "d" denotes the d-line, "g" denotes the g-line, "M" denotes a meridional image surface, "S" denotes a sagittal image surface, and a lateral chromatic aberration is represented by the g-line, where the Y-axis in the spherical aberration's graph is entrance pupil radius (or F number), the Y-axis in the astigmatism's, distortion's and chromatic aberration of magnification's graphs is image height.

In the exemplary embodiments described below, the wide-angle end and the telephoto end indicate the zoom positions when a lens unit used for changing magnification (the second lens unit L2a-c) is present at the opposite ends of a range in which the lens unit is mechanically movable along the optical axis. In addition, the expression "the zoom lens is at the wide-angle end" indicates that the zoom lens is in the wide-angle end configuration.

In the zoom lens system according to the exemplary embodiments, while the zoom lens zooms from the wide-angle end to the telephoto end, the first lens unit L1a-c is substantially reciprocated so as to move along the optical axis with a locus convex toward the image side, the second lens unit L2a-c moves to the object side along the optical axis, and the third lens unit L3a-c moves to the image side along the optical axis.

Zooming is performed by moving (A1-A3, B1-B3, and C1-C3) each of the lens units such that the gap between the first lens unit L1a-c and the second lens unit L2a-c when the zoom lens is at the wide-angle end is smaller and the gap between the second lens unit L2a-c and the third lens unit L3a-c when the zoom lens is at the wide-angle end is larger, compared with the corresponding gaps when the zoom lens is at the telephoto end.

In the zoom lens according to the exemplary embodiments, the magnification is changed mostly by the movement of the second lens unit L2a-c, and the displacement of the image point occurring when the magnification is changed is corrected by the reciprocation of the first lens unit L1a-c.

The F-number determining member SP is disposed between an object-side apex G21a of a lens element G21c-e which is disposed nearest to the object side among the lens elements of the second lens unit L2a-c and a point G21b at which an object-side surface S6 of the lens element G21c-e meets a periphery (edge) P6.

The F-number determining member SP is disposed in the second lens unit L2a-c, as described above, and moves (B1-B3) together with the second lens unit L2a-c during zooming, thus reducing the distance between an entrance pupil and the first lens unit L1a-c at the wide-angle side.

Since the placement of the aperture stop SP as described above enables the distance between the first lens unit L1a-c and the second lens unit L2a-c when the zoom lens is at the telephoto end to be reduced, a sufficient amount of movement (B1-B3) of the second lens unit L2a-c to the object side for zooming can be provided. Therefore, an increase in the length of the entire lens system when the zoom lens is at the telephoto end can be suppressed while at the same time a high zoom ratio is achieved.

To adjust the amount of light, a diaphragm unit capable of stopping down, an insertion/removal unit for a neutral density (ND) filter, and/or other units as known by one of ordinary skill in the relevant art can be disposed at the image side of the second lens unit L2a-c.

Concrete characteristics of the lens structure are described below.

The first lens unit L1a-c includes, in order from the object side to the image side, a negative lens element G11 and a positive lens element G12. The negative lens element G11 has a concave image-side surface. The positive lens element G12 has a meniscus shape and a convex object-side surface. This structure satisfactorily compensates for various aberrations while reducing the size of the entire lens system with a small number of lens elements.

The first lens unit L1a-c includes one or more aspherical surfaces. Therefore, distortion and curvature of field in a zoom range at the wide-angle side and spherical aberration at the telephoto side are satisfactorily compensated. One of the aspherical surfaces is formed in the image-side surface of the negative lens element G11. This aspherical shape is such that the curvature decreases toward the periphery, and this shape compensates for aberrations.

The second lens unit L2a-c includes at least one cemented lens having a positive refractive power and being composed of a positive lens element and a negative lens element.

More specifically, in the first and second exemplary embodiments illustrated in FIGS. 1 and 5, respectively, the second lens unit L2a-b includes, in order from the object side to the image side, a positive cemented lens G25a-b and a positive cemented lens G26a-b. The positive cemented lens G25a-b includes, in order from the object side to the image side, the positive lens element G21c-d and a negative lens element G22a-b. The positive cemented lens G26a-b includes, in order from the object side to the image side, a negative lens element G23a-b and a positive lens element G24a-b.

In the third exemplary embodiment illustrated in FIG. 9, the positive lens element G21e and the negative lens element G22c are separated. However, they can be a cemented lens.

The second lens unit L2a-c is prone to causing aberration variations with changing magnification. These aberration variations can be reduced by the use of a relatively symmetrical lens structure in the second lens unit L2a-c. When the second lens unit L2a-c is at an intermediate zoom position, a magnification of 1× is obtained. The second lens unit L2a-c has a structure of a developed triplet lens that consists of positive, negative, negative, and positive lens elements, and satisfactorily compensates for various aberrations while at the same time reducing aberration variations caused by a change in magnification. In particular, in the case of a high zoom ratio, the second lens unit L2a-c having the lens structure described above is effective for aberration compensation.

The object-side surface of the positive lens element G21c-e which is disposed nearest to the object side among the lens elements in the second lens unit L2a-c is convex in order to reduce off-axis aberrations from markedly occurring due to largely refracted off-axis principal rays that have passed through the first lens unit L1a-c.

Additionally, the object-side surface of the positive lens element G21c-e is convex in order to suppress the amount of spherical aberration resulting from axial diverging light rays that has passed through the first lens unit L1a-c. Furthermore, the object-side surface can be aspherical, thereby allowing spherical aberration occurring when the diameter of the zoom lens is increased to be satisfactorily compensated.

The negative lens element G22a-c includes a concave image-side surface. This convex image-side surface of the negative lens element G22a-c compensates for coma aberration occurring in the object-side surface of the positive lens element G21c-e.

Therefore, the shapes of the positive lens element G21c-e and the negative lens element G22a-c as described above satisfactorily compensates for both spherical aberration and coma aberration.

Since the positive cemented lens G25a-c including the positive lens element G21c-d and the negative lens element G22a-c is meniscus as a whole, it is difficult to markedly increase the refractive power. Therefore, in the exemplary embodiments, the positive refractive power of the second lens unit L2a-c is mostly supported by the positive cemented lens G26a-c, which is disposed at the image side. To reduce the thickness of the positive cemented lens G26a-c having such a strong refractive power, use of a glass material that has a high refractive index is effective. It is also useful to maintain achromatism, as expected in a cemented lens. Therefore, in the exemplary embodiments, a combination of glass materials of the negative lens element G23a-c and the positive lens element G24a-c included in the positive cemented lens G26a-c satisfies that each of the glass materials exhibits a high refractive index and that there are some differences in the Abbe number between the glass materials of both lens elements. Moreover, the positive cemented lens G26a-c has an appropriate refractive-power arrangement, thus both maintaining achromatism and reducing the thickness.

The structure described above reduces the occurrence of aberration in the second lens unit L2a-c caused with the realization of a higher zoom ratio over the full zoom range and facilitates a reduction in the thickness of the lens structure.

The positive lens element G21c-e and the negative lens element G22a-c does not necessarily constitute a cemented lens, and they can be separated as long as spherical aberration and coma aberration are satisfactorily compensated. Alternatively, they can be replaced with a meniscus single lens element that has a convex object-side surface. In this case, it can be necessary for the chromatic aberration to be compensated, for example by use of the positive cemented lens G26a-c.

The third lens unit L3a-c has a positive refractive power. The third lens unit L3a-c serves as a field lens, thereby attaining a telecentric image formation at the image side required for an image pickup apparatus using a solid-state image pickup device.

The third lens unit L3a-c is moved (C1-C3) to the image side when the zoom lens zooms from the wide-angle end to the telephoto end. However, in the zoom lens according to the exemplary embodiments, the third lens unit L3a-c can be stationary when the zoom lens zooms. In the case where the third lens unit L3a-c is not moved during zooming, a mechanism and an actuator required for driving is unnecessary. In the case where the third lens unit L3a-c is moved (C1-C3) for zooming, it can be necessary that the third lens unit L3a-c not be markedly moved to the object side when the zoom lens zooms from the wide-angle end to the telephoto end. If the third lens unit L3a-c is moved to the object side, the magnification of the third lens unit L3a-c is reduced, so that the zoom ratio of the entire system is reduced. Therefore, in order to achieve a higher zoom ratio, it can be necessary that, when the zoom lens zooms from the wide-angle end to the telephoto end, the gap between the second lens unit L2a-c and the third lens unit L3a-c be increased. Additionally, if the third lens unit L3a-c is moved to the image side when the zoom lens zooms from the wide-angle end to the telephoto end, the useful effect of changing magnification is further enhanced.

In the zoom lens according to the exemplary embodiments, it can be necessary that focusing be performed by the third lens unit L3a-c which has a small number of lens elements. This is useful in that the size of a focusing lens unit is reduced.

The exemplary embodiments are applicable to a zoom lens that moves two lens units (e.g., the first and second lens units or the first and third lens units) for zooming such that the gaps between the lens units are changed, in place of moving the three lens units.

Another lens unit with a small refractive power can be added at the object side with respect to the first lens unit L1a-c and/or at the image side with respect to the third lens unit L3a-c.

The zoom lens according to the exemplary embodiments is not limited to a three-unit structure including lens units of negative, positive, and positive refractive powers, respectively. Examples of an applicable zoom lens structure include a four-unit structure in which the second lens unit is divided into two positive lens units and the entire system consists of four lens units of negative, positive, positive, and positive refractive powers, respectively, and another four-unit structure in which the second lens unit is divided into two lens units, one being positive and the other being negative, and the entire system consists of four lens units of negative, positive, negative, and positive refractive powers, respectively.

As described above, according to the exemplary embodiments, in the zoom lens having the leading lens unit with a negative refractive power, constructing the lens units as described above achieves a high performance and a high zoom ratio of the order of 4× and reduces the thickness of the lens units.

In the zoom lens according to the exemplary embodiments, in order to obtain a satisfactory optical performance and/or to reduce the size of the entire lens system, at least one of the following conditions is satisfied. A useful effect associated with a corresponding condition is obtained.

At least one of the following conditions can be satisfied:

$$0.9 < f2c/f2 < 1.5 \tag{1}$$

$$1.8 < (N2p + N2n)/2 \tag{2}$$

$$15 < \nu 2n - \nu 2p < 30 \tag{3}$$

$$0.40 < |f2n|/f2 < 1.30 \tag{4}$$

$$1.0 \text{ [mm]} < D2c/((N2p + N2n)/2) < 1.3 \text{ [mm]} \tag{5}$$

$$4.0 \text{ [mm]} < M2/(ft/fw) < 5.0 \text{ [mm]} \tag{6}$$

$$0.01 < L12t/ft < 0.06 \quad (7)$$

$$0.5 < |f1|/ft < 0.8 \quad (8)$$

$$1.0 < f3/ft < 1.5 \quad (9)$$

$$0.03 < D2c/\{((N2p+N2n)/2) \cdot ft\} < 0.06 \quad (10)$$

$$0.7 < M2/ft < 0.8 \quad (11)$$

where f2c is the focal length of the positive cemented lens G26a-c which has the largest refractive power among one or more cemented lenses in the second lens unit L2a-c, f1 is the focal length of the first lens unit L1a-c, f2 is the focal length of the second lens unit L2a-c, f3 is the focal length of the third lens unit L3a-c, N2p is the refractive index of a material of the positive lens element G24a-c of the positive cemented lens G26a-c, N2n is the refractive index of a material of the negative lens element G23a-c of the positive cemented lens G26a-c, v2p is the Abbe number of the material of the positive lens element G24a-c of the positive cemented lens G26a-c, v2n is the Abbe number of the material of the negative lens element G23a-c of the positive cemented lens G26a-c, f2n is the refractive index of the negative lens element G23a-c of the positive cemented lens G26a-c, D2c is the thickness of the center of the positive cemented lens G26a-c, M2 is the maximum amount of movement of the second lens unit L2a-c along the optical axis when the zoom lens zooms from the wide-angle end to the telephoto end, fw is the focal length of the entire system when the zoom lens is at the wide-angle end, ft is the focal length of the entire system when the zoom lens is at the telephoto end, and L12t is the distance from a first image-side lens surface of the first lens unit L1a-c to a first object-side lens surface of the second lens unit L2a-c along the optical axis when the zoom lens is at the telephoto end, the first image-side lens surface being nearest to the image side in the first lens unit L1a-c, the first object-side lens surface being nearest to the object side in the second lens unit L2a-c.

The value ranges of conditional expressions (5) and (6) are shown when numerical examples described below are represented in millimeters. If the units of the numerical examples are changed, the units of the value ranges are changed accordingly.

Technical meanings of the above conditional expressions are described below.

Conditional expression (1) defines the focal length (i.e., refractive power) of the positive cemented lens G26a-c which has the largest refractive power in the second lens unit L2a-c. If the value is above the upper limit and the focal length is too long, i.e., the refractive power is too weak, other lens elements are required to support the refractive power of the second lens unit L2a-c accordingly. As a result, the other lens elements are required to compensate for spherical aberration and coma aberration occurring in the second lens unit L2a-c. Furthermore, in order to facilitate support of the refractive power, the number of lens elements is increased, the thickness of the second lens unit L2a-c is increased, and thus it is difficult to reduce the thickness of the zoom lens. If the value is below the lower limit and the focal length is too short, i.e., the refractive power is too strong, spherical aberration and coma aberration occurring in the positive cemented lens G26a-c are increased, and it is difficult for the second lens unit L2a-c as a whole to compensate for the increased aberrations.

Conditional expression (2) defines the average of the refractive indices of glass materials of the positive lens element G24a-c and the negative lens element G23a-c included in the positive cemented lens G26a-c in the second lens unit L2a-c.

If the value is below the lower limit and the average refractive index is low, it can be necessary to increase the curvature of each surface of the cemented lens in order to obtain a useful refractive power. In this case, the thickness of the positive lens element is increased to maintain a useful edge thickness difference, so that it is difficult to reduce the thickness of the zoom lens further.

In the exemplary embodiments, a reduction in the thickness of the second lens unit L2a-c is achieved by use of glass materials satisfying that the average refractive index is larger than the lower limit.

Conditional expression (3) defines the difference in the Abbe number between the material of the positive lens element G24a-c and the material of the negative lens element G23a-c included in the positive cemented lens G26a-c in the second lens unit L2a-c.

If the value is below the lower limit and the difference in the Abbe number is too small, it can be necessary to increase both the refractive power of the negative lens element G23a-c and the refractive power of the positive lens element G24a-c in order to attain achromatism. If the refractive powers are increased, the thickness of, in particular, the positive lens element G24a-c is increased to maintain a useful edge thickness difference, so that it is difficult to reduce the thickness of the zoom lens further. If the value is above the upper limit and the difference in Abbe number is too large, achromatism is realized without having to increase the refractive power of each of the lens elements. However, when a glass material satisfying that the difference in the Abbe number is larger than the upper limit is selected from among real-world glasses, it can be difficult to use a glass material that has a high refractive power in the positive lens element G24a-c. As a result, it can be difficult to reduce the lens thickness, compared with the case in which a glass material that has a high refractive power is used.

Conditional expression (4) defines the focal length of the negative lens element G23a-c included in the positive cemented lens G26a-c in the second lens unit L2a-c. If the value is above the upper limit and the focal length is too large, i.e., the refractive power is too small, achromatism expected as the positive cemented lens G26a-c is insufficient, and compensation of chromatic aberration is not enough. If the value is below the lower limit and the focal length is too small, i.e., the refractive power is too large, the curvature of the cemented lens surface is increased, and the thickness of the positive lens element G24a-c is increased. As a result, it is difficult to reduce the thickness of the zoom lens.

Conditional expression (5) defines the relationship between the thickness of the positive cemented lens G26a-c in the second lens unit L2a-c and the average refractive index of materials of the positive cemented lens G26a-c.

If the value is above the upper limit and the lens thickness is large with respect to the average refractive index, a reduction in the positive cemented lens G26a-c is insufficient. If there is enough edge thickness difference of the positive lens element G24a-c, a further reduction in the lens thickness is useful in terms of a reduction of the size. If there is not enough edge thickness difference of the positive lens element G24a-c, i.e., the refractive power of the positive lens element G24a-c is too strong, it is useful that the refractive power is reduced by the provision of a sufficient difference in the Abbe number between the positive lens element G24a-c and the negative lens element G23a-c to reduce the thickness of the zoom lens.

If the value is below the lower limit and the lens thickness is too small with respect to the average refractive index, the positive lens element G24a-c may not have enough edge thickness difference required for processing. Therefore, this case should be avoided. If the refractive power of the positive lens element G24a-c is weak and the value is below the lower limit, the refractive power of the positive cemented lens G26a-c itself is too small. In this case, it is useful to support the refractive power of the second lens unit L2a-c by use of other lens elements. In order to facilitate the support of the refractive power by use of the other lens elements while compensating for spherical aberration and coma aberration occurring in the second lens unit L2a-c, the number of lens elements can be increased, and as a result, the thickness of the second lens unit L2a-c is increased, and thus it is difficult to reduce the thickness of the zoom lens.

Conditional expression (6) defines the amount of movement of the second lens unit L2a-c associated with zooming. If the value is above the upper limit and the amount of movement is too large, the length of the entire lens when the zoom lens is at the telephoto end is long, and a reduction in the size is difficult. When the second lens unit L2a-c has an aperture stop, the F number when the zoom lens is at the telephoto end is too dark (large) with respect to that at the wide-angle end. In particular, when a solid-state image pickup device that has a small pixel pitch is used, a modulation transfer function (MTF) that is high at a high spatial frequency is necessary. However, in the case of a large F number, it is difficult to increase the MTF at a high spatial frequency due to the effect of diffraction even when aberration is compensated. If the value is below and the amount of movement is too small, it can be necessary to increase the refractive power of the second lens unit L2a-c to obtain a useful zoom ratio. In this case, the amount of variations in spherical aberration and coma aberration occurring with zooming is increased, and as a result, it can be difficult to obtain a high optical performance over the full zoom range.

Conditional expression (7) defines the gap between the first lens unit L1a-c and the second lens unit L2a-c when the zoom lens is at the telephoto end. If the value is above the upper limit and the gap is too large, the length of the entire lens system when zoom lens is at the telephoto end is large, and a reduction in the size is difficult.

If the value is below the lower limit and the gap is too small, a gap allowance when a manufacturing error is considered is insufficient. If the manufacturing error is large, the lens surfaces may be in contact, and this case should be avoided.

Conditional expression (8) defines the focal length of the first lens unit L1a-c. If the value is above the upper limit and the focal length is too large, i.e., the refractive power is too small, a refractive-power arrangement of a retrofocus type is too weak. As a result, it is difficult for the focal length when the zoom lens is at the telephoto end to realize an increased wide angle.

Additionally, a back focus that has a length required for inserting a filter when the zoom lens is at the wide-angle end cannot be maintained. If the value is below the lower limit and the focal length is too short, i.e., the refractive power is too large, a refractive-power arrangement of a retrofocus type is too strong. In this case, the back focus is too long and the length of the entire lens system is increased, and as a result, a reduction in the size is difficult. It is difficult to compensate for curvature of field and distortion aberration when the zoom lens is at the wide-angle end with a small number of lens elements even if an aspherical lens element is used. Therefore, it is useful that the value is equal to or larger than the lower limit for the sake of both a reduction in the thickness of the first lens unit L1a-c and aberration compensation.

Conditional expression (9) defines the focal length of the third lens unit L3a-c. If the value is above the upper limit and the focal length is too long, i.e., the refractive power is too small, the effect expected as a field lens is reduced, and therefore, it is difficult to locate an exit pupil away from the image plane. As a result, in the case where a solid-state image pickup device is used, the amount of light at the periphery decreases. In the case where focusing is performed by the third lens unit L3a-c, since the amount of leading is increased, a focus stroke is increased and a reduction in the size including a lens barrel structure is difficult. If the value is below the lower limit and the focal length is too short, i.e., the refractive power is too large, the Petzval sum is increased in the positive direction, the curvature of field is increased in the under direction, and this case should be avoided. Additionally, lateral chromatic aberration markedly occurs over the full zoom range. This can be reduced by an increased number of lens elements, but the increased number of lens elements makes a reduction of the thickness difficult.

Conditional expression (10) defines the relationship among the thickness of the positive cemented lens G26a-c in the second lens unit L2a-c, the average refractive index of the materials thereof, and the focal length of the entire system when the zoom lens is at the telephoto end.

If the value is above the upper limit and the lens thickness is large with respect to the average refractive index, a reduction in the thickness of the positive cemented lens G26a-c is insufficient. If there is enough edge thickness difference of the positive lens element G24a-c, a further reduction in the lens thickness is useful in terms of a reduction of the size. If there is not enough edge thickness difference of the positive lens element G24a-c, i.e., the refractive power of the positive lens element G24a-c is too strong, it is useful that the refractive power is reduced by the difference in the Abbe number between the positive lens element G24a-c and the negative lens element G23a-c to reduce the thickness of the zoom lens.

If the value is below the lower limit and the lens thickness is too small with respect to the average refractive index, the positive lens element G24a-c may not have enough edge thickness difference required for processing. Therefore, this case should be avoided. If the refractive power is weak and the value is below the lower limit, the refractive power of the positive cemented lens G26a-c itself is too small. In this case, it can be necessary to support the refractive power of the second lens unit L2a-c by use of other lens elements. In order to facilitate the support of the refractive power by use of the other lens elements while compensating for spherical aberration and coma aberration occurring in the second lens unit L2a-c, the number of lens elements can be increased, and as a result, the thickness of the second lens unit L2a-c is increased, and it can be difficult to reduce the thickness of the zoom lens.

Conditional expression (11) defines the relationship between the amount of movement of the second lens unit L2a-c associated with zooming and the focal length of the entire system when the zoom lens is at the telephoto end. If the value is above the upper limit and the amount of movement is too large, the length of the entire lens when the zoom lens is at the telephoto end is long, and a reduction in the size is difficult. When the second lens unit L2a-c has an aperture stop, the F number when the zoom lens is at the telephoto end is too dark (large) with respect to that at the wide-angle end. In particular, when a solid-state image pickup device that has a small pixel pitch is used, an MTF that is high at a high spatial frequency is necessary. However, in the case of a large F number, it can be difficult to increase the MTF at a high spatial frequency due to the effect of diffraction even when aberration is compensated. If the value is below and the amount of movement is too small, it can be necessary to increase the refractive power of the second lens unit L2a-c to obtain a useful zoom ratio. In this case, the amount of variations in spherical aberration and coma aberration occurring with zooming is increased, and as a result, it can be difficult to obtain a high optical performance over the full zoom range.

In the exemplary embodiments, the value ranges of conditional expressions (1) to (11) can be set as follows:

$$0.95 < f2c/f2 < 1.3 \tag{1a}$$

$$1.85 < (N2p+N2n)/2 \tag{2a}$$

$$18 < v2n-v2p < 27 \tag{3a}$$

$$0.45 < |f2n|/f2 < 1.20 \tag{4a}$$

$$1.10 \text{ [mm]} < D2c/((N2p+N2n)/2) < 1.25 \text{ [mm]} \tag{5a}$$

$$4.2 \text{ [mm]} < M2/(ft/fw) < 4.8 \text{ [mm]} \tag{6a}$$

$$0.02 < L12t/ft < 0.05 \tag{7a}$$

$$0.55 < |f1|/ft < 0.7 \tag{8a}$$

$$1.1 < f3/ft < 1.47 \tag{9a}$$

$$0.04 < D2c/\{((N2p+N2n)/2) \cdot ft\} < 0.055 \tag{10a}$$

$$0.71 < M2/ft < 0.78 \tag{11a}$$

As described above, the exemplary embodiments provide a zoom lens having a three-unit structure that includes lens units with negative, positive, and positive refractive powers. The zoom lens achieves a high zoom ratio, can satisfactorily compensate for aberrations over the full zoom range, reduce the thickness of the lens units, and locate an exit pupil sufficiently away from the image plane while maintaining compactness. The zoom lens is suited for a camera using a solid-state image pickup device.

The numerical examples are described below. In each of the numerical examples, i represents the order of a surface from the object side, Ri represents the radius of a curvature of an i-th surface, Di represents the distance between the i-th surface and an (i+1)-th surface (the lens thickness or the gap between the lens elements), Ni represents the refractive index of the i-th lens surface with respect to the d-line, and vi represents the Abbe number of the i-th lens surface with respect to the d-line. The two surfaces nearest to the image side are filters (e.g., a crystal low-pass filter and an infrared cut filter), and B, C, D, and E are the aspheric coefficients. The aspherical shape is represented by the following expression:

$$X = \frac{(1/R)H^2}{1 + \sqrt{1-(1+K)(H/R)^2}} + BH^4 + CH^6 + DH^8 + EH^{10}$$

where x is the amount of displacement at a height of H from the optical axis relative to an apex, R is the paraxial radius of curvature, and k is the conic constant.

In the numerical examples, "e-0X" refers to "×10$^{-X}$", f is the focal length, Fno is the F number, and ω is half of the angle of view. Table 1 shows the relationship between the conditional expressions described above and the numerical examples.

In the first to third numerical examples, the value of D5 is negative. This is because the F-number determining member and the positive lens element G21 are counted from the object side. This shows that, in the concrete structure, as illustrated in FIGS. 1, 5, and 9, the F-number determining member (aperture stop) SP is disposed closer to the image side by an absolute value of D5 from the object-side apex G21a on the object-side surface S6 of the lens element G21c-e which is nearer to the object side in the second lens unit L2a-c.

NUMERICAL EXAMPLE 1

| f = 5.96–22.74 Fno = 2.83–5.67 2ω = 58.7°–16.8° | | | |
|---|---|---|---|
| R1 = 70.717 | D1 = 1.60 | N1 = 1.859600 | v1 = 40.4 |
| R2 = 5.697 | D2 = 1.80 | | |
| R3 = 9.942 | D3 = 2.15 | N2 = 1.846660 | v2 = 23.9 |
| R4 = 31.390 | D4 = variable | | |
| R5 = stop | D5 = −0.50 | | |
| R6 = 4.649 | D6 = 1.94 | N3 = 1.804470 | v3 = 40.9 |
| R7 = 13.609 | D7 = 0.50 | N4 = 1.728250 | v4 = 28.5 |
| R8 = 3.922 | D8 = 0.83 | | |
| R9 = 10.518 | D9 = 0.50 | N5 = 2.003300 | v5 = 28.3 |
| R10 = 5.308 | D10 = 1.80 | N6 = 1.772499 | v6 = 49.6 |
| R11 = −37.360 | D11 = variable | | |
| R12 = 12.648 | D12 = 1.50 | N7 = 1.487490 | v7 = 70.2 |
| R13 = 113.450 | D13 = variable | | |
| R14 = ∞ | D14 = 1.40 | N8 = 1.516330 | v8 = 64.1 |
| R15 = ∞ | | | |

| Variable | Focal Length | | |
|---|---|---|---|
| Distance | 5.96 | 14.33 | 22.74 |
| D4 | 20.50 | 5.43 | 1.47 |
| D11 | 7.62 | 16.28 | 24.93 |
| D13 | 2.58 | 2.53 | 2.48 |

Aspheric Coefficients

R2  k=−2.11620e+00  B=9.84449e−04  C=−1.16189e−05  D=1.96807e−07  E=−1.99226e−09

R6  k=−4.32438e−01  B=2.01382e−04  C=5.92409e−06  D=4.04660e−07  E=0.00000e+00

NUMERICAL EXAMPLE 2

| f = 5.97–23.80 Fno = 2.87–5.86 2ω = 58.6°–16.0° | | | |
|---|---|---|---|
| R1 = 74.124 | D1 = 1.20 | N1 = 1.851350 | v1 = 40.1 |
| R2 = 5.717 | D2 = 1.80 | | |
| R3 = 9.882 | D3 = 2.15 | N2 = 1.846660 | v2 = 23.9 |
| R4 = 29.414 | D4 = variable | | |
| R5 = stop | D5 = −0.50 | | |
| R6 = 4.513 | D6 = 1.94 | N3 = 1.804470 | v3 = 40.9 |
| R7 = 7.214 | D7 = 0.50 | N4 = 1.805181 | v4 = 25.4 |
| R8 = 3.854 | D8 = 0.83 | | |
| R9 = 9.715 | D9 = 0.50 | N5 = 2.000690 | v5 = 25.5 |
| R10 = 5.594 | D10 = 1.80 | N6 = 1.772499 | v6 = 49.6 |
| R11 = −36.753 | D11 = variable | | |
| R12 = 11.371 | D12 = 1.50 | N7 = 1.487490 | v7 = 70.2 |
| R13 = 50.010 | D13 = variable | | |
| R14 = ∞ | D14 = 1.40 | N8 = 1.516330 | v8 = 64.1 |
| R15 = ∞ | | | |

| Variable | Focal Length | | |
|---|---|---|---|
| Distance | 5.97 | 14.87 | 23.80 |
| D4 | 20.83 | 5.18 | 1.23 |
| D11 | 8.73 | 17.51 | 26.29 |
| D13 | 1.53 | 1.48 | 1.43 |

Aspheric Coefficients

R2  k=−2.13650e+00  B=9.90788e−04  C=−1.06669e−05  D=1.25998e−07  E=−5.67618e−10

R6  k=−4.23174e−01  B=2.28241e−04  C=6.49652e−06  D=5.91858e−07  E=0.00000e+00

NUMERICAL EXAMPLE 3 f = 5.93–22.74  Fno = 2.85–5.73  2ω = 58.9°–16.8°

| R1 = 60.706 | D1 = 1.40 | N1 = 1.859600 | ν1 = 40.4 |
|---|---|---|---|
| R2 = 5.639 | D2 = 1.80 | | |
| R3 = 9.685 | D3 = 2.15 | N2 = 1.846660 | ν2 = 23.9 |
| R4 = 27.516 | D4 = variable | | |
| R5 = stop | D5 = −0.50 | | |
| R6 = 5.422 | D6 = 1.80 | N3 = 1.804470 | ν3 = 40.9 |
| R7 = 8.653 | D7 = 0.20 | | |
| R8 = 6.686 | D8 = 0.70 | N4 = 1.761821 | ν4 = 26.5 |
| R9 = 4.624 | D9 = 0.83 | | |
| R10 = 15.406 | D10 = 0.50 | N5 = 2.187000 | ν5 = 24.0 |
| R11 = 6.370 | D11 = 1.80 | N6 = 1.804000 | ν6 = 46.6 |
| R12 = −18.670 | D12 = variable | | |
| R13 = 14.038 | D13 = 1.50 | N7 = 1.487490 | ν7 = 70.2 |
| R14 = 113.450 | D14 = variable | | |
| R15 = ∞ | D15 = 1.40 | N8 = 1.516330 | ν8 = 64.1 |
| R16 = ∞ | | | |

| Variable | Focal Length | | |
|---|---|---|---|
| Distance | 5.93 | 14.32 | 22.74 |
| D4 | 20.07 | 5.07 | 1.14 |
| D12 | 7.62 | 16.28 | 24.93 |
| D14 | 2.78 | 2.73 | 2.68 |

Aspheric Coefficients

R2  k=−1.99863e+00  B=9.37155e−04  C=−6.39487e−06  D=8.78059e−09  E=7.48206e−10

R6  k=−4.64253e−01  B=6.78602e−05  C=1.90961e−06  D=6.75275e−08  E=0.00000e+00

TABLE 1

| Conditional Expressions | Numerical Examples | | |
|---|---|---|---|
| | 1 | 2 | 3 |
| 1 | 1.10 | 1.10 | 0.98 |
| 2 | 1.88790 | 1.88659 | 1.99550 |
| 3 | 21.30 | 24.14 | 22.57 |
| 4 | 0.95 | 1.16 | 0.56 |
| 5 | 1.22 | 1.22 | 1.15 |
| 6 | 4.51 | 4.38 | 4.49 |
| 7 | 0.04 | 0.03 | 0.03 |
| 8 | 0.66 | 0.63 | 0.65 |
| 9 | 1.26 | 1.25 | 1.44 |

TABLE 1-continued

| Conditional Expressions | Numerical Examples | | |
|---|---|---|---|
| | 1 | 2 | 3 |
| 10 | 0.054 | 0.051 | 0.051 |
| 11 | 0.76 | 0.73 | 0.76 |

In the first to third exemplary embodiments, all the three lens units (first to third lens units) in the zoom lens move along the optical axis for zooming. However, the present invention is not limited to this structure. For example, the third lens unit can be stationary in the optical axis direction during zooming, and the zoom lens can zoom from the telephoto end to the wide-angle end by moving only the first and second lens units along the optical axis. In other words, not all of the lens units can be moved for zooming (during zooming) as long as the gaps between the lens units can be changed.

The term "cemented lens" used in the exemplary embodiments indicates a lens in which a plurality of lens elements are cemented together over substantially the entire their facing surfaces within their clear apertures (at least over the position of the optical axis). Therefore, the "cemented lens" in the exemplary embodiments does not include a lens in which lens elements are cemented (closely attached) together over only portions outside their clear apertures.

An exemplary embodiment of a digital still camera (image pickup apparatus) using a zoom lens according to at least one exemplary embodiment as an image-taking optical system is described below with reference to FIG. 13.

In FIG. 13, a camera body 20 incorporates a solid-state image pickup device (e.g., photoelectric conversion device) 22 configured to receive light of an object's image formed by an image-taking optical system 21, which includes the zoom lens according to at least one exemplary embodiment. Examples of the solid-state image pickup device 22 include a CCD sensor and a CMOS sensor. A memory 23 is used for storing information corresponding to the object's image subjected to photoelectrical conversion. A viewfinder 24 can be made, for example from a liquid-crystal display panel or other display device as known by one of ordinary skill in the relevant art for use in observing the object's image formed on the solid-state image pickup device 22.

As described above, a zoom lens in accordance with at least one exemplary embodiment can be applied to an image pickup apparatus (e.g., digital still camera), thus facilitating the small image pickup apparatus with high optical performance.

As described above, according to at least one exemplary embodiment, a zoom lens having a compact entire lens system and exhibiting a high zoom ratio and an image pickup apparatus that including the zoom lens are provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-257698 filed Sep. 6, 2005 and No. 2006-192904 filed Jul. 13, 2006, which are hereby incorporated by reference herein in their entirety.

What is claimed is:

1. A zoom lens comprising, in order from an object side to an image side:

a first lens unit with a negative refractive power;

a second lens unit with a positive refractive power; and a third lens unit with a positive refractive power,
wherein each of the first and second lens units moves for zooming such that a first gap between the first lens unit and the second lens unit when the zoom lens is at a wide-angle end is smaller than the first gap when the zoom lens is at a telephoto end and such that a second gap between the second lens unit and the third lens unit when the zoom lens is at the wide-angle end is larger than the second gap when the zoom lens is at the telephoto end, and
wherein the second lens unit includes at least one positive cemented lens, wherein, where a first lens cemented lens has the largest refractive power among the at least one positive cemented lens, the first cemented lens includes a first positive lens element and a first negative lens element, and the following conditions are satisfied:

$$0.9 < f2c/f2 < 1.5$$

$$1.8 < (N2p+N2n)/2$$

$$15 < v2n-v2p < 30$$

where f2c is the focal length of the first cemented lens, f2 is the focal length of the second lens unit, N2p is the refractive index of a material of the first positive lens element included in the first cemented lens, N2n is the refractive index of a material of the first negative lens element included in the first cemented lens, v2p is the Abbe number of the material of the first positive lens element included in the first cemented lens, and v2n is the Abbe number of the material of the first negative lens element included in the first cemented lens.

2. The zoom lens according to claim 1, wherein the following condition is satisfied:

$$0.40 < |f2n|/f2 < 1.30$$

where f2n is the refractive index of the first negative lens element.

3. The zoom lens according to claim 1, wherein the following condition is satisfied:

$$0.03 < D2c/\{((N2p+N2n)/2) \cdot ft\} < 0.06$$

where D2c is the thickness of the center of the first cemented lens and ft is the focal length of the entire system when the zoom lens is at the telephoto end.

4. The zoom lens according to claim 1, wherein the following condition is satisfied:

$$0.7 < M2/ft < 0.8$$

where M2 is the maximum amount of movement of the second lens unit along the optical axis when the zoom lens zooms from the wide-angle end to the telephoto end and ft is the focal length of the entire system when the zoom lens is at the telephoto end.

5. The zoom lens according to claim 1, wherein the following condition is satisfied:

$$0.01 < L12t/ft < 0.06$$

where L12t is a distance from a first image-side lens surface of the first lens unit to a first object-side lens surface of the second lens unit along the optical axis when the zoom lens is at the telephoto end, the first image-side lens surface being nearest to the image side in the first lens unit, the first object-side lens surface being nearest to the object side in the second lens unit, and ft is the focal length of the entire system when the zoom lens is at the telephoto end.

6. The zoom lens according to claim 1, wherein the following conditions are satisfied:

$$0.5 < |f1|/ft < 0.8$$

$$1.0 < f3/ft < 1.5$$

where f1 is the focal length of the first lens unit, f3 is the focal length of the third lens unit, and ft is the focal length of the entire system when the zoom lens is at the telephoto end.

7. The zoom lens according to claim 1, wherein the second lens unit includes, in order from the object side to the image side, a positive lens element having a convex object-side surface, a negative lens element having a convex object-side surface, and a cemented lens in which a negative lens element having a convex object-side surface and a positive lens element having a convex object-side surface are cemented together.

8. The zoom lens according to claim 1, wherein the zoom lens forms an image on a solid-state image pickup device.

9. The zoom lens according to claim 1, wherein the third lens unit moves for zooming.

10. An image pickup apparatus comprising:
a solid-state image pickup device; and
a zoom lens configured to form an image on the solid-state image pickup device,
wherein the zoom lens comprises, in order from an object side to an image side:
a first lens unit with a negative refractive power;
a second lens unit with a positive refractive power; and
a third lens unit with a positive refractive power,
wherein each of the first and second lens units moves for zooming such that a first gap between the first lens unit and the second lens unit when the zoom lens is at a wide-angle end is smaller than the first gap when the zoom lens is at a telephoto end and such that a second gap between the second lens unit and the third lens unit when the zoom lens is at the wide-angle end is larger than the second gap when the zoom lens is at the telephoto end, and
wherein the second lens unit includes at least one positive cemented lens, wherein, where a first lens cemented lens has the largest refractive power among the at least one positive cemented lens, the first cemented lens includes a first positive lens element and a first negative lens element, and the following conditions are satisfied:

$$0.9 < f2c/f2 < 1.5$$

$$1.8 < (N2p+N2n)/2$$

$$15 < v2n-v2p < 30$$

where f2c is the focal length of the first cemented lens, f2 is the focal length of the second lens unit, N2p is the refractive index of a material of the first positive lens element included in the first cemented lens, N2n is the refractive index of a material of the first negative lens element included in the first cemented lens, v2p is the Abbe number of the material of the first positive lens element included in the first cemented lens, and v2n is the Abbe number of the material of the first negative lens element included in the first cemented lens.

* * * * *